United States Patent
Morris

(10) Patent No.: US 7,904,296 B2
(45) Date of Patent: Mar. 8, 2011

(54) SPOKEN WORD SPOTTING QUERIES

(75) Inventor: Robert W. Morris, Atlanta, GA (US)

(73) Assignee: Nexidia Inc., Atlanta, GA (US)

( * ) Notice: Subject to any disclaimer, the term of this patent is extended or adjusted under 35 U.S.C. 154(b) by 83 days.

(21) Appl. No.: 10/565,570

(22) PCT Filed: Jul. 22, 2004

(86) PCT No.: PCT/US2004/023676
§ 371 (c)(1),
(2), (4) Date: Jul. 21, 2006

(87) PCT Pub. No.: WO2005/010866
PCT Pub. Date: Feb. 3, 2005

(65) Prior Publication Data
US 2007/0033003 A1    Feb. 8, 2007

Related U.S. Application Data

(60) Provisional application No. 60/489,589, filed on Jul. 23, 2003.

(51) Int. Cl.
*G10L 15/04* (2006.01)
(52) U.S. Cl. .......... 704/254; 704/231; 704/251; 704/243
(58) Field of Classification Search .......... 704/231, 704/256.5, 243, 256, 255, 254, 251
See application file for complete search history.

(56) References Cited

U.S. PATENT DOCUMENTS

| | | | | |
|---|---|---|---|---|
| 5,165,007 A * | 11/1992 | Bahl et al. | ...................... | 704/243 |
| 5,199,077 A * | 3/1993 | Wilcox et al. | ................ | 704/256 |
| 5,425,129 A * | 6/1995 | Garman et al. | ............... | 704/256 |
| 5,509,104 A * | 4/1996 | Lee et al. | ...................... | 704/256 |
| 5,625,748 A * | 4/1997 | McDonough et al. | ........ | 704/251 |
| 5,649,057 A * | 7/1997 | Lee et al. | ...................... | 704/256 |
| 5,748,840 A | 5/1998 | La Rue | | |
| 5,794,194 A * | 8/1998 | Takebayashi et al. | ........ | 704/251 |
| 5,797,123 A * | 8/1998 | Chou et al. | ................. | 704/256.5 |
| 5,895,464 A | 4/1999 | Bhandari et al. | | |
| 5,918,222 A | 6/1999 | Fukui et al. | | |
| 6,061,652 A * | 5/2000 | Tsuboka et al. | .............. | 704/245 |
| 6,073,095 A * | 6/2000 | Dharanipragada et al. | ... | 704/242 |
| 6,185,527 B1 * | 2/2001 | Petkovic et al. | ............. | 704/231 |

(Continued)

FOREIGN PATENT DOCUMENTS
EP     0 800 158     10/1997

OTHER PUBLICATIONS

R. Rose and D. Paul. A hidden Markov model based keyword recognition system. In Proc. I W P. pp. 129-132, NM, Apr. 1990.*

(Continued)

*Primary Examiner* — Richemond Dorvil
*Assistant Examiner* — Greg A Borsetti
(74) *Attorney, Agent, or Firm* — Occhiuti Rohlicek & Tsao LLP

(57) ABSTRACT

An approach to wordspotting (180) using query data from one or more spoken instance of a query (140). The query data is processed to determining a representation of the query (160) that defines multiple sequences of subword (130) units each representing the query. Then putative instances of the query (190) are located in input data from an audio signal using the determined representation of the query.

19 Claims, 2 Drawing Sheets

U.S. PATENT DOCUMENTS

| | | | |
|---|---|---|---|
| 6,317,710 B1 | 11/2001 | Huang et al. | |
| 6,345,253 B1 | 2/2002 | Viswanathan | |
| 6,434,520 B1 | 8/2002 | Kanevsky et al. | |
| 6,873,993 B2* | 3/2005 | Charlesworth et al. | 707/102 |
| 6,985,861 B2 | 1/2006 | Thong et al. | |
| 7,212,968 B1* | 5/2007 | Garner et al. | 704/251 |
| 7,542,966 B2* | 6/2009 | Wolf et al. | 707/3 |
| 7,590,605 B2* | 9/2009 | Josifovski | 706/29 |
| 7,747,611 B1* | 6/2010 | Milic-Frayling et al. | 707/722 |
| 2002/0013706 A1* | 1/2002 | Profio | 704/254 |
| 2002/0052740 A1* | 5/2002 | Charlesworth et al. | 704/220 |
| 2002/0052870 A1 | 5/2002 | Charlesworth et al. | |
| 2002/0120447 A1* | 8/2002 | Charlesworth et al. | 704/254 |
| 2003/0110035 A1* | 6/2003 | Thong et al. | 704/254 |
| 2003/0187643 A1* | 10/2003 | Van Thong et al. | 704/254 |
| 2003/0204399 A1* | 10/2003 | Wolf et al. | 704/251 |
| 2003/0204492 A1* | 10/2003 | Wolf et al. | 707/3 |
| 2004/0083099 A1 | 4/2004 | Scarano et al. | |
| 2005/0010412 A1* | 1/2005 | Aronowitz | 704/254 |
| 2007/0038450 A1* | 2/2007 | Josifovski | 704/255 |

OTHER PUBLICATIONS

T. Kawahara, C.-H. Lee, and B.-H. Juang. 1998. Flexible speech understanding based on combined key-phrase detection and verification. IEEE Trans. on Speech and Audio Processing, 6(6):558-568.*

Ng K, Zue V (1997) Subword unit representations for spoken document retrieval. In: Proc. Eurospeech 97. ESCA.*

Jonathan Foote, An overview of audio information retrieval, Multimedia Systems, v.7 n. 1, p. 2-10, Jan. 1999.*

Sheridan, M. Wechsler and P. Schauble, Cross-language speech retrieval: establishing a baseline performance. In: Proc. 20th Ann. Internat. ACM SIGIR Conference on Research and Development in Information Retrieval (SIGIR-97) (1997), pp. 99-107.*

Foote JT, Jones GJF, Sparck Jones K, Young SJ (1997) Unconstrained keyword spotting using phone lattices. Comput Speech Lang, vol. 11, p. 207-224, 1997.*

Helen M. Meng, Wai-Kit Lo, Berlin Chen, and Karen Tang. 2001. Generating Phonetic Cognates to Handle Named Entities in English-Chinese Cross-Language Spoken Document Retrieval. Proceedings of ASRU.*

James DA, Young SJ (1994) A fast lattice-based approach to vocabulary independent wordspotting. In: Proc. ICASSP 94, vol. 1, Adelaide, Australia. IEEE CS Press, Piscataway, N.J., pp. 377-380.*

Clements, M., Cardillo, P., and Miller, M. (2001). Phonetic searching of digital audio. Broadcast Engineering Conference Proceedings. Washington: National Association of Broadcasters, pp. 131-140.*

H. Bekker et al. "Inventory of Metadata for Multimedia", Sep. 2000.*

Phonetic Searching vs. LVCSR: How to Find What You Really Want in Audio Archives pp. 9-22(14) Authors: Cardillo P.S.; Clements M.; Miller M.S. Jan. 2002.*

Yuk-Chi Li, Wai-Kit Lo, Helen M. Meng and P. C. Ching. 2000 Query expansion using phonetic confusions for Chinese spoken document retrieval. IRAL: Proceedings of the fifth international workshop on on Information retrieval with Asian languages.*

Quackenbush et al. "Overview of MPEG-7 AudioOverview of MPEG-7 Audio" 2001.*

Jones et al. "Retrieving Spoken Documents by Combining Multiple Index Sources" 1996.*

Logan et al. "Confusion-Based Query Expansion for Oovwords in Spoken Document Retrieval" 2002.*

Ng et al. "Experiments in spoken document retrieval using phoneme n-grams" 2000.*

Amir et al. "Advances in Phonetic Word Spotting" 2001.*

Ng et al. "Phonetic Recognition for Spoken Documents Retrieval" 1998.*

Srinivasan et al. "Phonetic Confusion Matrix Based Spoken Document Retrieval" 2000.*

Stuker. "Automatic Generation of Pronunciation Dictionaries" 2002.*

Abberley, et al. "Retrieval of Broadcast News Documents With the Thisl System," Proc. IEEE ICASSP'98, pp. 3781-3784 (1998).

Brown, et al. "Open Vocabulary Speech Indexing for Voice and Video Mail Retreival," Proc. of ACM Multimedia pp. 307-316 (1996).

Deshmukh, et al. "Automated Generation of N-Best Pronunciations of Proper Nouns," Proc. IEEE ICASSP'96 pp. 283-286 (1996).

Makhoul et al., "Speech and Language Technologies for Audio Indexing and Retrieval," Proc. IEEE, 88(8), pp. 13381353 (2000).

International Search Report, Patent Cooperation Treaty, Oct. 8, 2004, 11 pages.

Preliminary Examination Report, Patent Cooperation Treaty, Feb. 2, 2006, 7 pages.

James D. A. et al., "A fast lattice-based approach to vocabulary independent wordspotting," Acoustics, Speech, and Signal Processing, 1994. ICASSP-94, 1994 IEEE International Conference on Adelaide, SA, Australia Apr. 19-22, 1994, New York, NY, USA, IEEE, vol. i, pp. I-377, XP010133516.

Supplementary European Search Report for the Application No. 04757219.3-2225 dated Dec. 11, 2007, 4 pages.

Cooper et al.; "Building Searchable Collections of Enterprise Speech Data"; JCDL '01, Jun. 24-28, 2001; Roanoke, VA.

Choi et al.; "SCAN—SpeechContent Based Audio Navigator: A Systems Overview"; Proceedings of International Conference on Spoken Language Processing; Jan. 15, 1998.

* cited by examiner

SPOKEN WORD SPOTTING QUERIES

CROSS-REFERENCE TO RELATED APPLICATIONS

This application claims the benefit of U.S. Provisional Application No. 60/489,589 filed Jul. 23, 2003, which is incorporated herein by reference.

BACKGROUND

This invention relates to word spotting using spoken queries.

Word spotting (which is understood to include phrase spotting, spotting of more complex linguistically-based events, and related techniques for detection of events) is a type of speech recognition in which occurrences of linguistically-based events are detected in an input acoustically-based signal. Word spotting, as well as speech recognition in general, has been performed using phonetically-based statistical models. In such word spotting systems, a query is represented in terms of phonetic units, for instance as a sequence of phonemes, which are then used to construct statistical models based on parameters associated with the phonemes.

When a query is represented in text form, it can be converted into a phonetic representation using dictionaries and/or linguistic rules. The accuracy of the phonetic representation can affect the ability of the word spotting system to detect occurrences of the query.

SUMMARY

In one aspect, in general, the invention features a method, and corresponding system and computer software, in which query data from one or more spoken instance of a query are accepted, and then processed. Processing the query data including determining a representation of the query that defines multiple sequences of subword units each representing the query. Then putative instances of the query are located in input data from an audio signal using the determined representation of the query.

Aspects of the invention can include one or more of the following features:

The query can represent a single word, a phrase or sequence of words, a larger linguistic unit, or a complex query such as a Boolean query of a query that includes components such as a wildcard or a time interval.

A speech recognition algorithm, which may be implemented as a software procedure and/or a hardware circuit, is applied to the query data. The speech recognition algorithm can be a statistical algorithm, such as one based on Hidden Markov Models (HMMs), or be based on other pattern matching approaches.

The query data can represent the spoken instances of the query as waveform samples, signal processing features, or other acoustically-based data. The query data can also include the result of application of another speech recognition algorithm or procedure.

The subword units can include linguistic units, such as phonetically-based units.

A word spotting algorithm configured using the determined representation of the query can be applied to locate the putative instances of the query.

Parameter values of the speech recognition algorithm for application to the query data are selected according to characteristics of the word spotting algorithm. The parameter values of the speech recognition algorithm can be selected to optimize an accuracy (or other performance measure) of the word spotting algorithm. For example, an expected detection rate or a false alarm rate or a combination of the two can be optimized.

The parameters for which values can be selected can include one or more of an insertion factor, a recognition search beam width, a recognition grammar factor, and a number of recognition hypotheses.

Determining the representation of the query can include determining a network of the subword units. The multiple sequences of subword units can then correspond to different paths through the network.

An n-best list of recognition results can also be determined, and each of the multiple sequences of subword units can correspond to a different one in the n-best list of recognition results.

Audio data representing the spoken utterances of the query spoken by a user, and processed to form the query data.

A user can make a selection portions of stored data from a previously accepted audio signal, and these portions of the stored data are processed to form the query data.

Prior to accepting the selection by the user, the previously accepted audio signal can be processed according to a first speech recognition algorithm to produce the stored data. This first speech recognition algorithm can produce data related to presence of the subword units at different times in the audio signal. Processing the query data then includes applying a second speech recognition algorithm to the query data.

Aspects of the invention can include one or more of the following advantages.

By choosing the parameters of the speech recognition algorithm according to the performance of the word spotting algorithm, the accuracy of the word spotting algorithm can be improved as compared to choosing parameters for the speech recognition algorithm according to an accuracy of that algorithm. For example, if the subword units are phonemes, the parameters of the speech recognition system are not necessarily chosen to optimize phonemic transcription accuracy and can rather be chosen to optimize word spotting accuracy.

Use of spoken queries, as opposed to text-based queries, allows hands-free operation of an audio search engine. For example, in applications such as video editing, an operator may not have hands free to easily use a keyboard, but can speak portions of dialog which is then located.

Queries can be processed without necessarily having a dictionary or letter-to-sound rules for a target language. Furthermore, processing of the query can be optimized for cross-language applications in which the query is spoken in a first language but the second speech recognition system has been trained for a second language.

Other features and advantages of the invention are apparent from the following description, and from the claims.

DESCRIPTION

Figure 1:
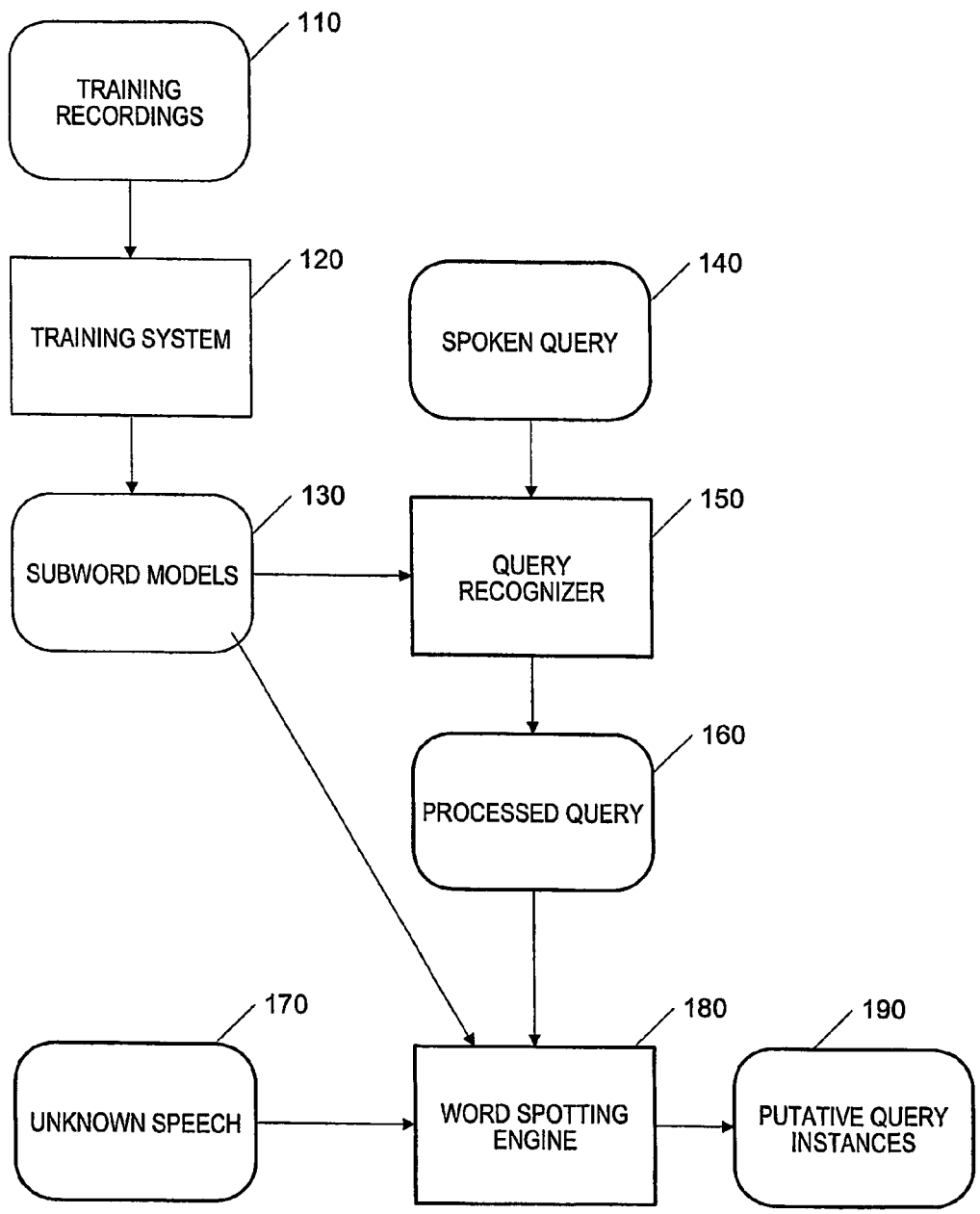
FIG. 1 is a block diagram of a word spotting system.

Referring to FIG. 1, a word spotting system 100 uses a spoken query 140 to process unknown speech 170 to locate putative query instances 190 associated with the query in the unknown speech. Unknown speech 170 includes acoustically-based data which is derived from an acoustic signal by sampling the waveform and optionally computing signal processing features or statistically based quantities based on the waveform independently of the spoken query.

In different modes of operation of the word spotting system 100, the spoken query 140 can be based on one or more of a number of sources of acoustic input, including being based on an utterance by a user of the system, or on a segment of acoustically-based data derived from an earlier acoustic input. For user-based input, a user of the system speaks the query one or more times, and the system processes the acoustic input of the user's utterances. For example, if the user want to locate instances of a person's name (which the user may not know how to spell, or may originate in a foreign language and therefore may not have a well-defined representation using English units), the user speaks the name into a microphone and the system processes that speech to form the query.

The word spotting system 100 includes a query recognizer 150, which includes an implementation of a speech recognition algorithm and which is used to process acoustically-based data associated with the spoken query. The query recognizer 150 produces a processed query 160. The processed query 160 includes a data representation of the query in terms of subword linguistic units, which in this version of the system are English language phonemes. This representation of the query defines one or more possible sequences of subword units that can each correspond to the query. The data representation of the processed query 160 defines a network representation of the query such that paths through the network each correspond to a possible sequence of subword units.

A word spotting engine 180 then uses the processed query 160 to process the unknown speech 170, which is input to the word spotting system 100. The word spotting engine 180 determines time locations at which the query is likely to have occurred, optionally each associated with a score that characterizes a confidence that the query truly occurred there. These time locations are referred to as "putative" query instances because it is possible that some of the instances do not truly correspond to the query having been spoken at those times.

Both the query recognizer 150 and the word spotting engine 180 make use of Hidden Markov Model (HMM) technology, which make use of subword models 130 that are trained based on training recordings 110. A training system 120 implements a statistical training procedure to determine observation models and state transition probabilities of the subword models. The subword models 130 include a set of English-language phoneme. In this version of the system, each phoneme is represented as a three-state "left-to-right" model. Other forms of HMMs can alternatively be used for the subwork units.

The word spotting engine uses a probability scoring approach in which a probability of the query event occurring is computed for different times in the unknown speech and putative query instances are reported when the probability exceeds a threshold.

Figure 2:
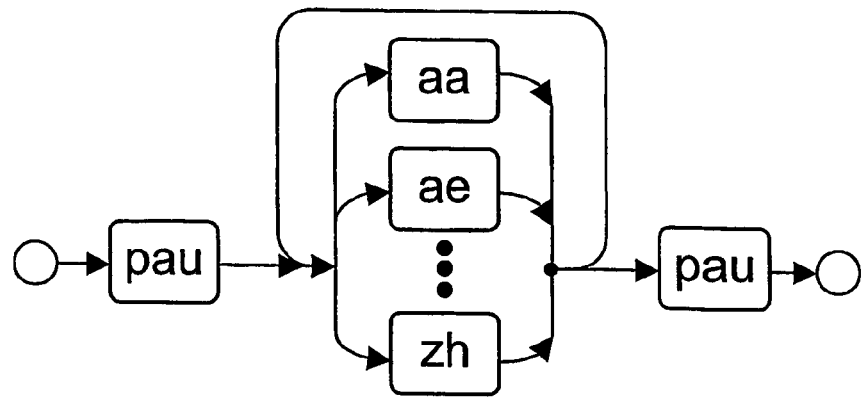
FIG. 2 is a looped phoneme grammar.

There are alternative versions of the query recognizer 150, or ways of configuring the query recognizer, which produces processed query 160. In one version, the query recognizer 150 recognizes the spoken query using a looped phoneme grammar as shown in FIG. 2. The nodes "aa" through "zh" represent the different phoneme subword units, and "pau" represents a model for a silence or inter-word pause.

Figure 3:
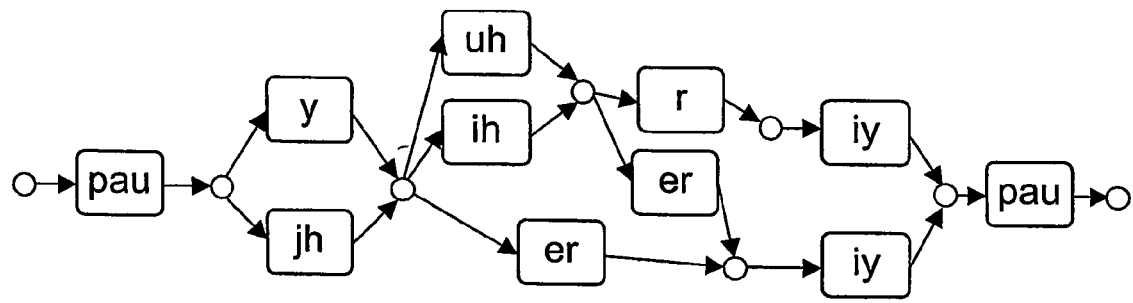
FIG. 3 is network representation of a query.

The processed query 160 produced by the query recognizer can take the form of a network representation of a phoneme lattice. For example, the network shown in FIG. 3 is a network representation of a phoneme lattice associated with a spoken query of the word "jury." This network is generated by first computing a phoneme lattice for the spoken query, and then representing all or an automatically selected subset of elements of the lattice as a network.

Figure 4:
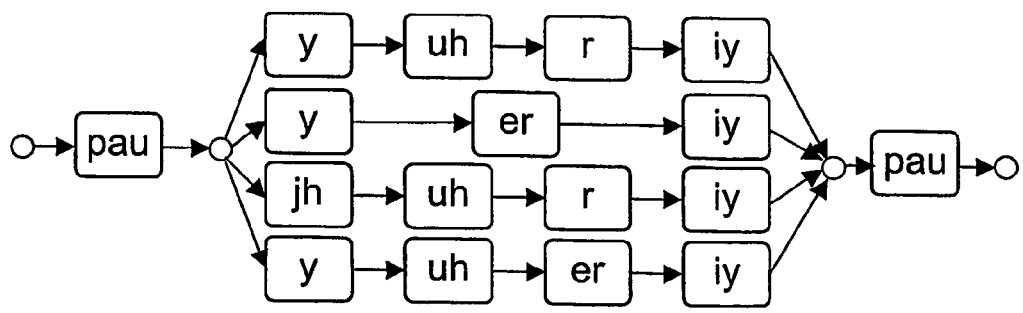
FIG. 4 is a network representation of a query formed using an n-best approach.

Another way for the query recognizer 150 to produce the processed query 160 is to perform an n-best recognition of the spoken query based on the phoneme grammar shown in FIG. 2. Each of the n-best phoneme recognition results is then used to form one branch of a network with parallel branches. Such a network formed by an n-best approach is shown in FIG. 4, again for the word "jury." The n-best lists can be computed from a phoneme lattice determined from the spoken query.

Another way for the query recognizer 150 to produce the processed query 160 is to generate a confusion network from a phoneme lattice. The confusing network includes a series of parallel combinations of confusable phonemes that together represent the query.

In another alternative, rather than using the phoneme grammar shown in FIG. 2, an n-gram Markov model can be used to introduce prior sequence probabilities for the subword units into the recognition of the spoken query.

Parameters of the query recognizer 150, which affect the processing of a spoken query 140 to form the processed query 160, are chosen so that the resulting processed query 160 yields accurate results when used by the word spotting engine 180. These parameters do not necessarily correspond to parameters that might be chosen to yield the highest phoneme accuracy if the query recognizer were evaluated in those terms.

The choice of values of the parameters for the query recognizer 150 is determined by using a number of reference queries that are processed by the query recognizer for various settings of the parameter values. The different processed queries which correspond to the different values of the parameters are used by the word spotting engine to process known input speech in which the true locations of query events are known but not used by the word spotting engine. After processing the known speech with the word spotting engine, an overall performance is quantified for the various different choices of parameter values, and the set of parameter values that yields the highest performance is chosen for configuring the query recognizer.

Alternative parameter selection approached can also be used. For example, one class of alternative approaches is based on an iteration in which overall performance is measured or estimated for a set of parameter values at each iteration, and the set of parameter values is updated and performance measured repeatedly until a final set of parameter values are chosen when the iteration converges or is terminated by a predetermined rule (e.g., based on the number of iterations or on the change in the parameter values on successive iterations).

Different measures of overall performance can be used, and in general, each of these different measures corresponds to different best set of values of the parameters. For example, one set of parameter values may be best suited to yield a high detection rate for queries, another for the lowest false alarm rate, and another for the best tradeoff between false alarms and detections.

A number of different parameters of the query recognizer have been found to actually affect, or are expected to affect, the accuracy of the word spotting engine. One such parameter is a phoneme insertion factor, typically represented as a penalty that is introduced affect the length in number of phonemes that are produced by the query recognizer. Reducing the penalty generally increases the length of phoneme sequences produced by the query recognizer in processing a spoken query. In experiments, it has been found that this penalty is best set at a value that typically generates more phonemes than are found in phonetic transcription of the query.

Another parameter is a beamwidth in a Viterbi algorithm HMM search carried out by the query recognizer 150. The beamwidth parameter is a pruning parameter that affects which or how many partial hypotheses are pruned during recognition because they are relatively unlikely as compared to the highest or higher scoring hypotheses. With a larger beamwidth parameter, the network representations in the processed query 160 tend to be "fuller" representing a larger number of different possible phoneme sequences for the query.

Another parameter is the number of recognition hypotheses in an n-best approach. The larger "n" the more alternative phoneme sequences are used to represent the query. Yet another parameter relates to the contribution, or weight, of the phoneme n-gram probabilities during recognition of the spoken query.

In some versions of the word spotting system 100, multiple examples of a query are used as the spoken query 140 that is input to the query recognizer 150. For instance, the user can speak a query multiple times. These multiple spoken queries are then combined by the query recognizer to form a single processed query. Each instance of the spoken query can be associated with a distinct portion of the network, for example, by combining the n-best recognition results for each instance, or combined to form a single overall network.

In another way of using multiple examples of a query, rather than the user repeatedly speaking a query, the user identifies portions of an acoustically-based data of an earlier acoustic signal, for example, identifying portions of a previously recorded waveform. The earlier acoustic signal may, for example, be associated with the unknown speech that is input to the system, or be associated with a training corpus of representative acoustic input. In this way, further instances of the same words or phases can be detected.

The approach of using utterances by the user and instances of the query in previous acoustic input can be combined such that some examples come from the user and other examples of the query come from representative acoustic input.

Note that as introduced above, although the discussion uses the phrase "word spotting" and words as examples of queries, queries can equally be phrases, or large units such as sentences, or can even form complex expressions, such as combinations of phrases with "wildcard" or optional portions.

The subword units do not necessarily have to correspond to linguistic units, or to lingustic units in the language contained in the unknown speech 170 that is to be processed by the word spotting engine. For example, a corpus of subword units trained from English can be used for queries spoken in another language. The subword units can correspond to linguistic units from one or more languages, or come from a universal set. The subword units can also be identified using other techniques and do not necessarily correspond to linguistic units. For example, the subword units can be identified independent of transcriptions, such as by training an ergodic Hidden Markov Model. Because trained subword units from the target language are not necessary with at least some of these alternatives, it is possible to perform wordspotting (and further processing based on the result of wordspotting) without requiring any transcribed training speech from the target language.

Optionally, the different model parameters can be used by the query recognizer and by the word spotting engine. For example, the model parameters used by the query recognizer may be matched to the acoustic conditions in which the user is expected to utter examples of a query, while the model parameters used by the word spotting engine may be matched to the acoustic conditions (e.g., noise level) of the unknown speech.

Processing of the spoken queries and unknown speech can optionally be performed in two stages. In a first stage, the processing makes use of the subword models 130 to derive the acoustically-based input of the spoken query and/or of the unknown speech. For example, probabilities that each of the phonemes occur at different times in the input are computed in the first stage. This computation can occur for the unknown speech prior to the query being defined. Similarly, in the mode of operation in which queries are identified in a recording, this preprocessing can occur prior to identifying the portions of the recording that contain the query. Then, processing of the query to form the processed query 160 and processing of the unknown speech to locate the putative query instances each proceed with a separate second state processing. In one alternative of the first stage processing, phoneme lattice is precomputed and later used to process the query and to detect instances of the query. In another alternative, "forward" and/or "backward" probabilities are precomputed and stored and used by the further processing.

One application of techniques described above is for searchable voice information system for the visually impaired. The Talking Books cassette player offers a standard and familiar interface that legally blind consumers are familiar with due to the distribution of units at no cost by 3rd party state, federal, and private non-profit agencies. The function buttons on the Talking Book cassette player have standard tactile symbols to help the user identify them. Changes to the Talking Books interface support the random access capabilities of a digital audio medium, add additional functionality, and map functions to control surfaces suitable for use with much smaller personal digital devices. The device includes a microphone to record voice annotations and a speaker to play back these messages. Buttons on the box allow the user to perform basic store and retrieve functions in much the same way that audio is recorded and played back on other audio recording devices. These buttons support management functions such as "Record", "Search", and "Delete" and navigation functions such as "Jump Back", "Reverse", "Stop", "Forward", and "Jump Forward". Additionally, each button has appropriate tactile icons to aide in identification of function.

Simple voice queries initiate the speech searching algorithm. The search function interface is implemented as a press-to-talk feature that records the spoken query phrase while being pressed and stops recording when released. Immediately after the press-to-talk button is released, the search returns a ranked list of matches from all of the recorded voice annotations in the system (the current algorithm can search over 30 hours of recorded audio in less than one second). The user can immediately begin playing back and navigating through the list of match results or they can refine the search by speaking another search phrase.

By pressing the button between subsequent search refinement phrases, a form of compound Boolean search is supported while avoiding the limitations of automatic speech recognition to segment the Boolean components. To simplify search mechanics, the user will not have to specify different types of Boolean operators (AND, OR, NOT . . . ). This is similar to Internet searches that look for matches on one or more words in the typed search phrase. Without the user needing to explicitly enter Boolean operators, search results are ranked by whether the match contains all of the words, how closely the search words are grouped together spatially, etc. The device uses similar assumptions about search operator combinations that would be most useful and will merge these into the same search. For example, if a user executes a search for phrase A followed by a refined search with phrase B then the search results will include matches that contain A AND B as well as matches that contain A OR B. Along with the search algorithm scores, order on the list are determined by how close the search phrases appear, whether they both appear, and the order that they appear.

The following scenario illustrates the Boolean search function with a woman named Susan who wishes to search for a recipe she got from a friend named Burdell. Susan remembers recording directions for Burdell's chili recipe last year. She has more than one chili recipe and multiple references to Burdell stored on her system along with thousands of other voice annotations totaling over 3 hours of digitized audio. Susan initiates her search by pressing the search button and speaking "Burdell". In less than one second, the system returns search results with the highest ranked matches listed first. Stepping through the first few matches, Susan quickly realizes that these contain "Burdell", but they are not related to the chili recipe. To refine her search, she presses the search button again (preempting any currently playing record) and speaks "chili". A new list of search results is presented using the Boolean search rules discussed previously. While scoring high as a match, the first few results describe a "Burdell" song favorite called "Chilly Night." Susan remembers referencing Burdell's song many times in her system, so she refines her search by pressing the search button and adding "recipe". The top match brings success: "Chile Recipe by George P. Burdell . . . ."

The primary audio presentation from this system will be the playback of the users own voice recorded annotations. These records can be played back at normal speed, fast-forward, and reverse to increase search and navigation efficiency. In addition, prerecorded instructions, synthesized speech, and non-speech audio cues will also be used to assist with navigation and control options. Simple tones and polyphonic sounds will be used for alerts, navigation markers, and command mode indicators. Use of non-speech audio cues has been shown to be a useful tool for the purposes of user feedback, rapid information presentation, and navigation within hierarchical structures.

The audio presentation will allow the user to quickly review the list of audio records that is returned by the search engine. After a search is completed, the system will report to the user what was searched for and what was found. For example, the interface could announce, "Search for spoken phrase returned eight matches". In this example, a prerecorded voice will speak the fixed message, the user's voice will speak the spoken phrase, and a synthesized voice might speak the variable number. The user can play through the entire list of matches at normal speed, fast forward, or skip through the list much like skipping tracks on a CD player. Each matching records could range in length from a few seconds to many minutes, and each result in the list will be cued up to play the audio just before the matched search phase. The word spotting search algorithm will provide a score for each match, and the system will produce a short, non-verbal audio cue that will precede each audio result in order to communicate search result score. This will give the user a general idea about the success of the search. If the very first search result has a bad score the user will then immediately know that the search was not successful (even if several possible results were returned). The interface will report to the user when the end of the list is reached. For example, it may play a special sound or play a spoken message: "You have reached the end of the list. Press the Stop button to end the search or press the Reverse buttons to review previous records".

Alternative systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

The invention claimed is:

1. A method comprising:
receiving input from a user identifying at least a first portion and a second portion of a first set of audio signals as being of interest to the user, wherein the first portion corresponds to a first instance of an entire spoken event of interest in the first set of audio signals and the second portion corresponds to a second instance of the entire spoken event of interest in the first set of audio signals;
processing, by a query recognizer of a word spotting system, each identified portion of the first set of audio signals to generate a corresponding subword unit representation of the identified portion;
forming, by the query recognizer of the word spotting system, a representation of the entire spoken event of interest, wherein the forming includes combining the subword unit representations of the respective identified portions of the first set of audio signals;
accepting, by a word spotting engine of the word spotting system, data representing unknown speech in a second audio signal; and
locating, by the word spotting engine of the word spotting system, putative instances of the entire spoken event of interest in the second audio signal using the representation of the spoken event of interest, wherein the locating includes identifying time locations of the second audio signal at which the entire spoken event of interest is likely to have occurred based on a comparison of the data representing the unknown speech with the representation of the entire spoken event of interest, wherein the first instance of the entire spoken event of interest and the second instance of the entire spoken event of interest include a common set of words, and wherein the subword unit representation corresponding to the first portion and the subword unit representation corresponding to the second portion are different.

2. The method of claim 1 wherein processing each identified portion of the first set of audio signals comprises applying a computer-implemented speech recognition algorithm to data representing the first set of audio signals.

3. The method of claim 2 wherein locating the putative instances includes applying a computer-implemented word spotting algorithm configured using the representation of the entire spoken event of interest.

4. The method of claim 3 further comprising selecting processing parameter values of the speech recognition algorithm for application to the data representing the first set of audio signals according to characteristics of the word spotting algorithm.

5. The method of claim 4 wherein the selecting of the processing parameter values of the speech recognition algorithm includes optimizing said parameters according to an accuracy of the word spotting algorithm.

6. The method of claim 4 wherein the selecting of the processing parameter values of the speech recognition algorithm includes selecting values for parameters including one or more of an insertion factor, a recognition search beam width, a recognition grammar factor, and a number of recognition hypotheses.

7. The method of claim 1 wherein the subword units include linguistic units.

8. The method of claim 1 wherein the representation of the entire spoken event of interest defines a network of subword units.

9. The method of claim 8 wherein the network of subword units is formed by multiple sequences of subword units that correspond to different paths through the network.

10. The method of claim 1 wherein forming the representation of the entire spoken event of interest includes determining an n-best list of recognition results.

11. The method of claim 10 wherein each sequence of subword units in the representation corresponds to a different one in the n-best list of recognition results.

12. The method of claim 1, further comprising accepting first audio data representing utterances of the entire event of interest spoken by a user, and processing the first audio data to form a processed query.

13. The method of claim 1, further comprising accepting a selection by the user of portions of stored data from the first set of audio signals, and processing the portions of the stored data to form a processed query.

14. The method of claim 13 further comprising, prior to accepting the selection by the user, processing the first set of audio signals according to a first computer-implemented speech recognition algorithm to produce the stored data.

15. The method of claim 14 wherein the first speech recognition algorithm produces data related to presence of the subword units at different times in the first set of audio signals.

16. The method of claim 14, further comprising applying a second speech recognition algorithm to the processed query.

17. A tangible computer-readable medium storing instructions for causing a processing system to:

receive input from a user identifying at least a first portion and a second portion of a first set of audio signals as being of interest to the user, wherein the first portion corresponds to a first instance of an entire spoken event of interest in the first set of audio signals and the second portion corresponds to a second instance of the entire spoken event of interest in the first set of audio signals;

process each identified portion of the first set of audio signals to generate a corresponding subword unit representation of the identified portion;

form a representation of the entire spoken event of interest, wherein the instructions for causing the processing system to form the representation include instructions for combining the subword unit representations of the respective identified portions of the first set of audio signals;

accept data representing unknown speech in a second audio signal; and locate putative instances of the entire spoken event of interest in the second audio signal using the representation of the entire spoken event of interest, wherein the instructions for causing the processing system to locate the putative instances include instructions for identifying time locations of the second audio signal at which the entire spoken event of interest is likely to have occurred based on a comparison of the data representing the unknown speech with the specification of the entire spoken event of interest.

18. A system comprising:

a speech recognizer for
  receiving input from a user identifying at least a first portion and a second portion of a first set of audio signals as being of interest to the user, wherein the first portion corresponds to a first instance of an entire spoken event of interest in the first set of audio signals and the second portion corresponds to a second instance of the entire spoken event of interest in the first set of audio signals;
  processing each identified portion of the first set of audio signals to generate a corresponding subword unit representation of the identified portion, and
  forming a representation of the entire spoken event of interest, wherein the forming includes combining the subword unit representations of the respective identified portions of the first set of audio signals;

a data storage for receiving the representation of the entire spoken event of interest from the speech recognizer;

a word spotter configured to use the representation of the entire spoken event of interest to locate putative instances of the entire spoken event of interest in data representing unknown speech in a second audio signal.

19. The system of claim 18, wherein the word spotter is further configured to identify time locations of the second audio signal at which the entire spoken event of interest is likely to have occurred based on a comparison of the data representing the unknown speech with the representation of the entire spoken event of interest, wherein the first instance of the entire spoken event of interest and the second instance of the entire spoken event of interest include a common set of words, and wherein the subword unit representation corresponding to the first portion and the subword unit representation corresponding to the second portion are different.

* * * * *